United States Patent [19]

Hassenpflug et al.

[11] Patent Number: 4,702,106

[45] Date of Patent: Oct. 27, 1987

[54] METHOD FOR DETERMINING THE HORIZONTAL AIRSPEED OF HELICOPTERS IN LOW SPEED RANGES

[75] Inventors: Wolfgang Hassenpflug, Freiburg; Rainer Schwäble, Garbsen, both of Fed. Rep. of Germany

[73] Assignee: Litef GmbH, Freiburg im Breisgau, Fed. Rep. of Germany

[21] Appl. No.: 872,044

[22] Filed: Jun. 6, 1986

[30] Foreign Application Priority Data

Jun. 11, 1985 [EP] European Pat. Off. ........ 85107190.2

[51] Int. Cl.$^4$ ............................................. G01C 21/10
[52] U.S. Cl. .................................... 73/181; 73/178 H
[58] Field of Search .............. 73/181, 178 H; 364/443

[56] References Cited

U.S. PATENT DOCUMENTS

4,023,409 5/1977 Durand .............................. 73/178 H

FOREIGN PATENT DOCUMENTS

0094778 11/1983 European Pat. Off. .......... 73/178 H
2282644 3/1976 France .
2444275 7/1980 France .
1181669 2/1970 United Kingdom .
2037688 7/1980 United Kingdom ............ 73/178 H Primary Examiner—Donald O. Woodiel
Attorney, Agent, or Firm—Elliott N. Kramsky

[57] ABSTRACT

A method is disclosed for determining the horizontal airspeed of helicopters in low speed ranges. At least three control functions, $\bar{\theta}_{o,i}$ (collective pitch), $\bar{\theta}_{s,i}$ (longitudinal control) and $\bar{\theta}_{c,i}$ (lateral control) are measured. The magnitude of the horizontal airspeed, $V_{H,i}$, is determined from its known relationship to $\bar{\theta}_{o,i}$. This magnitude is included in non-linear calibration equations $\bar{\theta}_s(V_{H,i},\psi)$ and $\bar{\theta}_c(V_{H,i},\psi)$ and control profiles $\bar{\theta}_s(V_{H,i},\psi)$ and $\bar{\theta}_c(V_{H,i},\psi)$ are derived therefrom. The measured values $\bar{\theta}_{s,i}$ and $\bar{\theta}_{c,i}$ are applied to the respective control profiles and corresponding phase pairs $\psi_{s,1}$, $\psi_{s,2}$ and $\psi_{c,1}$, and $\psi_{c,2}$ located. The pairs are compared and the incident flow angle $\psi_i$ is determined as the value common to the two pairs. From this information, the components of the horizontal airspeed are found from the relationships:

$$V_{x,i} = V_{H,i} \cos \psi_i$$

$$V_{y,i} = V_{H,i} \sin \psi_i.$$

6 Claims, 9 Drawing Figures

METHOD FOR DETERMINING THE HORIZONTAL AIRSPEED OF HELICOPTERS IN LOW SPEED RANGES

BACKGROUND

1. Field of the Invention

The present invention relates to methods for determining airspeed. More particularly, this invention pertains to a method for measuring the horizontal airspeed of helicopters in low speed ranges.

2. Description of the Prior Art

Due to their design, helicopters exhibit increased instability at decreased airspeeds. This effect is particularly acute when hovering. This mode of low airspeed flight requires a very large amount of control action, increasing the responsibilities of the pilot accordingly. As the various control inputs depend directly on external disturbances (e.g. wind), the airspeed provides an important corrective. The precise determination and visual indication of airspeed is, however, quite difficult in the low speed ranges. Further, knowledge of the wind velocity is required for calculation of directional corrections necessary for the delivery of weapons from combat helicopters. Continual determination of the wind velocity additionally permits estimation of the velocity over the ground in the event of a Doppler radar failure.

In the high speed range (velocities exceeding 20 m/s), a conventional aerodynamic data system based on measured temperature and pressure differences (conventional in rigid wing aircraft) provides adequate airspeed measurement. However, such systems do not perform adequately at speeds below 20 m/s for a number of reasons. These include the limited working range (above 10 m/s) of commercial pitot-static tubes, perturbation effects caused by the rotor downwind and the multiple degrees of freedom of directional movement of helicopters (rearward, sideways and vertical flight).

Two technical solutions are currently utilized to determine airspeed (i.e. the velocity of the helicopter relative to the surrounding air) at speeds below 20 m/s. One of these is LASSIE (Low Air Speed Sensing and Indicating Equipment). This system is produced by the GEC Company (England) and is described by J. Kaletka in "Evaluation of the Helicopter Low Air Speed System LASSIE", *Rotorcraft and Powered Lift Aircraft Forum,* (Garmisch-Partenkirchen 1982). The other system is known as LORAS (LOw Range Air Speed System) and is produced by the PACER COMPANY of the United States. That system is described by P. J. Onksen in "Helicopter Omnidirectional Air Data Systems," *IEEE* 1983. Both of these systems provide mechanical solutions based upon conventional air data technology (differential pressure measurement and temperature measurement).

The LASSIE system is based upon classical air data measurement using the pitot-static tube and includes a probe that can be rotated about two axes. The probe is provided with a small tailplane for correct alignment in the air stream. In LASSIE, the yaw angle $\beta$ and the incidence angle $\alpha$ are measured and, in combination with temperature and pressure difference measurements, the velocity V is determined.

The essential feature of the measuring arrangement in the LORAS system, on the other hand, is a double-armed probe that rotates with constant velocity above the rotor. A solid connection between the probe and the helicopter casing is provided by a stationary tubular column supported in the rotor shaft. The two major arms have a diametral location. A tangentially sensitive venturi tube is located at the end of each arm. Each sensor is connected to a differential pressure gauge. If the probe rotates with constant velocity, no pressure difference is detected in hovering flight and a cyclic difference signal is detected with a phase position that corresponds to forward or sideward flight. The amplitude of the signal is a measure of horizontal airspeed, while the phase gives the incident flow direction.

The LASSIE and LORAS systems involve mechanical solutions in which the airspeed is measured externally. That is, the actual measuring elements must be mounted on the outer skin of the cabin or, after passage through the rotor shaft, above the rotor. Externally located measuring elements not only require special maintenance and care, but are particularly sensitive to damage. In military applications, efforts are commonly made to avoid externally located measuring devices because of their high vulnerability.

SUMMARY OF THE INVENTION

It is, therefore, the object of the invention to determine the low speed range airspeed of helicopters by means of a system or method that substantially avoids externally located measuring devices while providing airspeed values in at least two axes with relatively high accuracy.

The present invention overcomes the aforesaid shortcomings of the prior art and achieves the above object by providing a new method for determining the horizontal airspeed of a helicopter in low speed ranges. The method of the invention includes numerous steps including determining and then storing a first relationship between collective pitch $\theta_o$ and airspeed, a second relationship between longitudinal control value $\theta_s$ and airspeed and a third relationship between control value $\theta_c$ and airspeed for a plurality of directions of incident airflow $\psi$ for the helicopter. Thereafter, values of $\bar{\theta}_{o,i}$ $\bar{\theta}_{c,i}$ and $\bar{\theta}_{s,i}$ are detected. Horizontal airspeed magnitude, $V_{H,i}$ is determined from the first stored relationship and $\bar{\theta}_{o,i}$. Then a longitudinal control profile $\bar{\theta}_s$ ($V_{H,i}$, $\psi$) is derived from such airspeed value and the values of the second stored relationship while a lateral control profile $\bar{\theta}_c$ ($V_{H,i}$, $\psi$) is derived from the airspeed value and the values of the third stored relationship. The detected value of lateral control $\bar{\theta}_{c,i}$ is then applied to the lateral control profile to determine a corresponding first pair of incident angles $\psi_{c,1}$ and $\psi_{c,2}$ and the detected value of longitudinal control $\bar{\theta}_{s,i}$ is applied to the longitudinal control profile to determine a corresponding second pair of incident angles $\psi_{s,1}$, and $\psi_{s,2}$. The first and second incident angle pairs are then compared and the angular that is common to the pairs is selected as the incident angle value $\psi_i$. The components of horizontal airspeed are then calculated as:

$$V_{x,i} = V_{H,i} \cos \psi_i$$

$$V_{y,i} = V_{H,i} \sin \psi_i.$$

The preceding and additional features and advantages of this invention will become further apparent from the detailed description that follows. The written description is accompanied by a set of drawing figures. Corresponding numerals point to like features in the drawing figures and in the written description, like numerals referring to like features of the invention throughout.

DETAILED DESCRIPTION

The present invention is based upon investigations of the way in which individual helicopter control functions depend upon design data and the mutual couplings between such control data. Calibration functions are produced and stored that are based upon such investigations. Instantaneous control data is obtained from the motions of appropriate control levers operated by the pilot through the use of various transducers. Such transducers can include voltage function generators (for example potentiometers), synchros, resolvers or known inductive signal generators. The signals are processed according to the invention and the velocity values thereby obtained.

In general, the control of a helicopter is a function of four separate factors: collective pitch, $\theta_o$ (common setting of rotor blade angles); longitudinal control, $\theta_s$ (cyclic blade angle adjustment in sine mode); lateral control, $\theta_c$ (cyclic blade angle adjustment in cosine mode); the pedal, $\theta_H$ (common adjustment of blade angles of the tail rotor).

Figure 1:
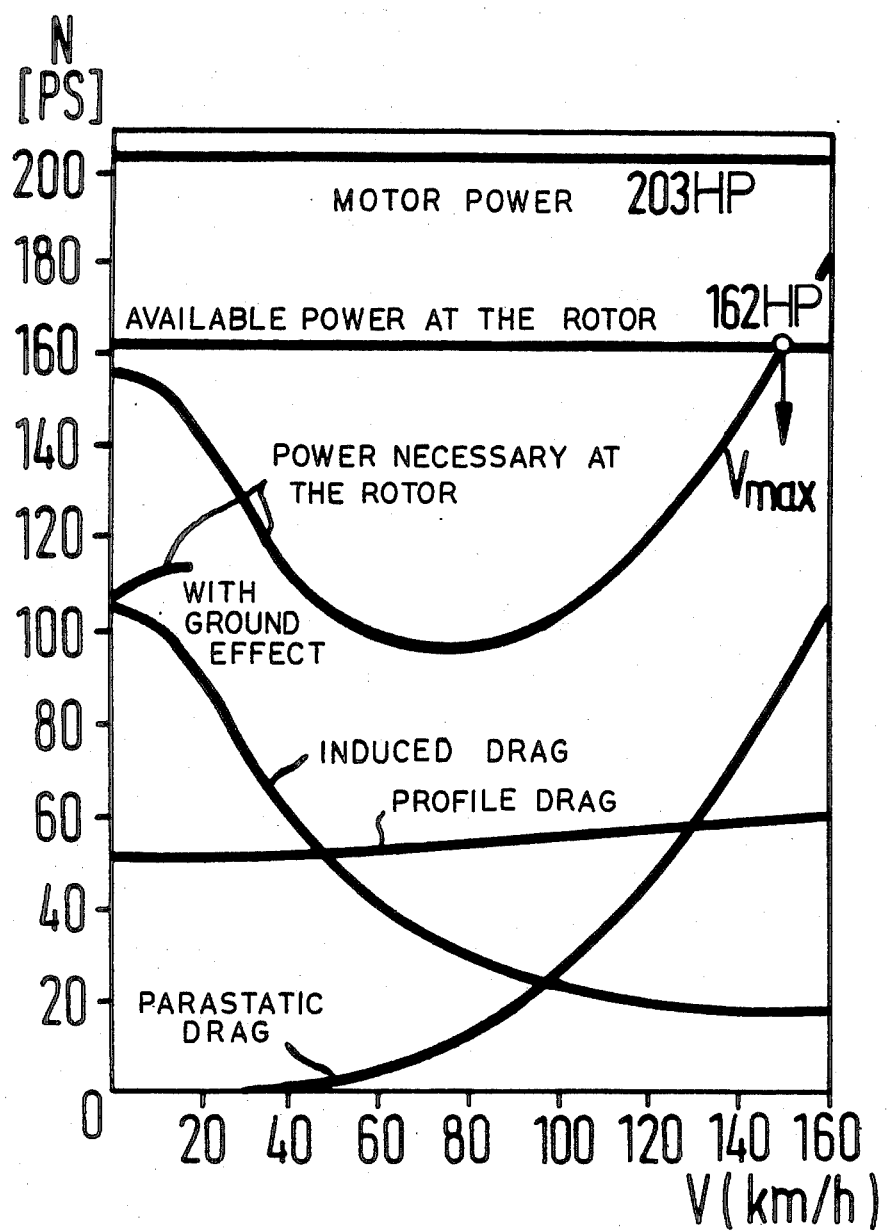
FIG. 1 is a rotor power diagram for a known helicopter.
Figure 5:
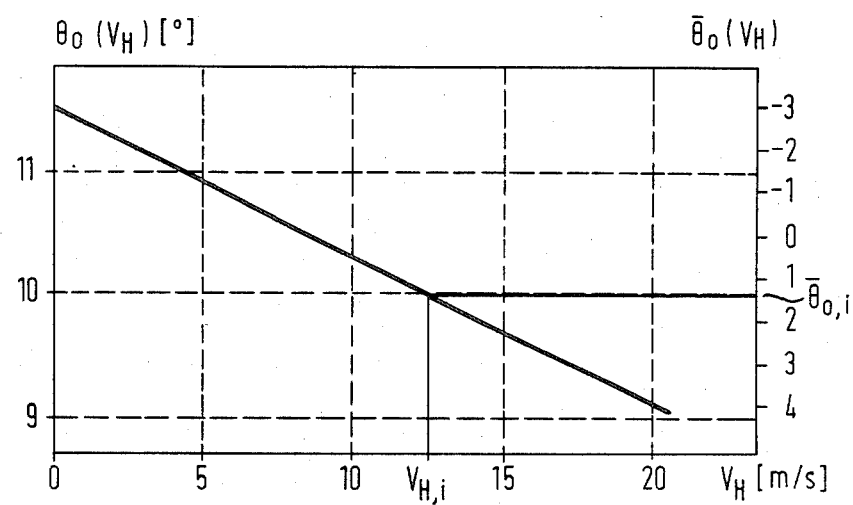
FIG. 5 is a calibration diagram for determining the magnitude of velocity at low speeds as a function of the collective pitch.

At constant rotor speed, the collective pitch angle $\theta_o$ is a measure of the power of the rotor which must overcome induced, parasitic and profile drags during flight. As may be seen from FIG. 1, a rotor power diagram for a known helicopter, the latter two types of drag are practically constant in the low speed range. Induced drag, on the other hand, decreases sharply with increasing velocity. The reason for this is associated with direct incident air flow that reduces the proportion of the air which is induced by the rotor's own power. For this reason, the power or the collective pitch angle $\theta_o$ substantially provides a measure of airspeed in the low speed range. FIG. 5, a calibration diagram for determining the magnitude of velocity at low speeds as a function of collective pitch, shows a specific example, explained in greater detail below, of the linear relationship between the magnitude of the velocity and the collective pitch angle.

For the helicopter to achieve a given airspeed, the thrust vector must be inclined somewhat away from the vertical. This is accomplished by means of cyclic control angles (i.e. the longitudinal control $\theta_s$ and the lateral control $\theta_c$). Since the angles of the rotor blades are changed cyclically, the plane of the rotor and the thrust vector are inclined by a corresponding amount. The two cyclic control angles are coupled together by the flow through the rotor. Thus, when the longitudinal control is modified, it is also necessary to activate the lateral control. The relationship between these coupling effects is explained, for example, the MBB report VD-260-78 by A. Faulkner entitled "Investigations Concerning an Observer Concept for the Wind Velocity in the Hovering and Low Speed Range of Helicopters," Ottobrunn 1979 ("Untersuchungen zu einem Beobachterkonzept fuer die Windgeschwindigkeit im Schwebeund Langsamf Lugbereich von Hubschraubern") and in *Helicopter Dynamics and Aero Dynamics*, P. R. Payne, (Pitman & Sons, London, 1959).

Figure 2:
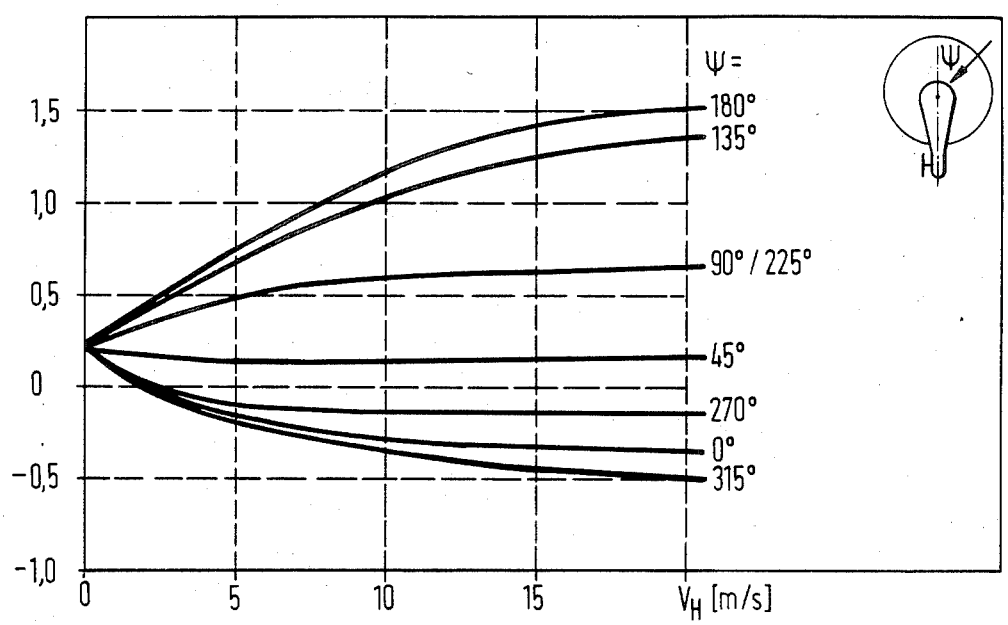
FIGS. 2 and 3 are diagrams for determining the couplings of the two typical control angles (longitudinal and lateral) due to flow through the rotor.
Figure 3:
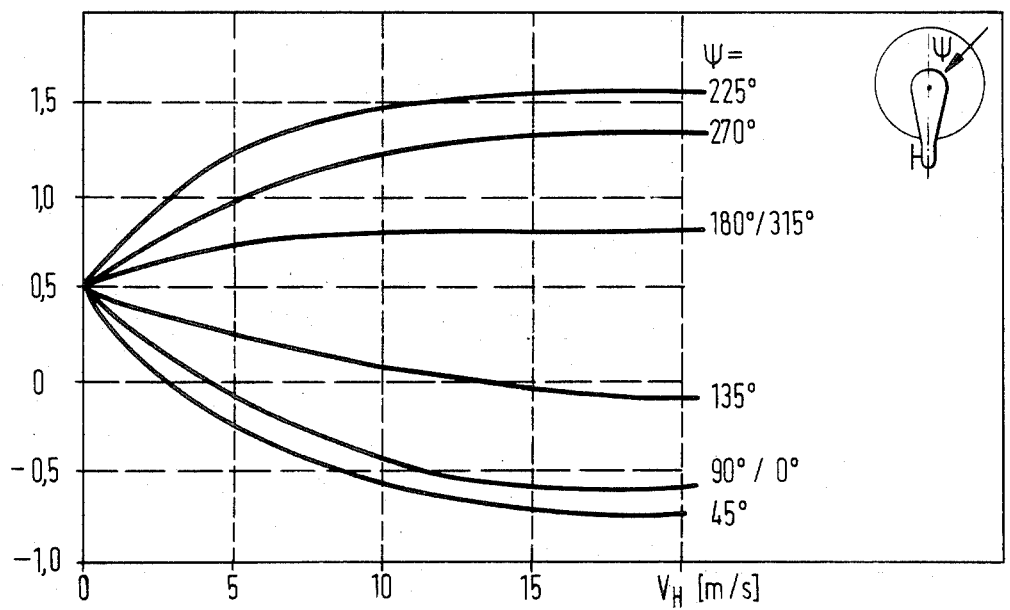

The nature of the couplings between the two cyclic control angles $\theta_s$ and $\theta_c$ is illustrated in the diagrams of FIGS. 2 and 3. In the diagrams, the two cyclic control functions are plotted versus airspeed $V_H$ for selected incident flow directions $\psi$.

Figure 4:
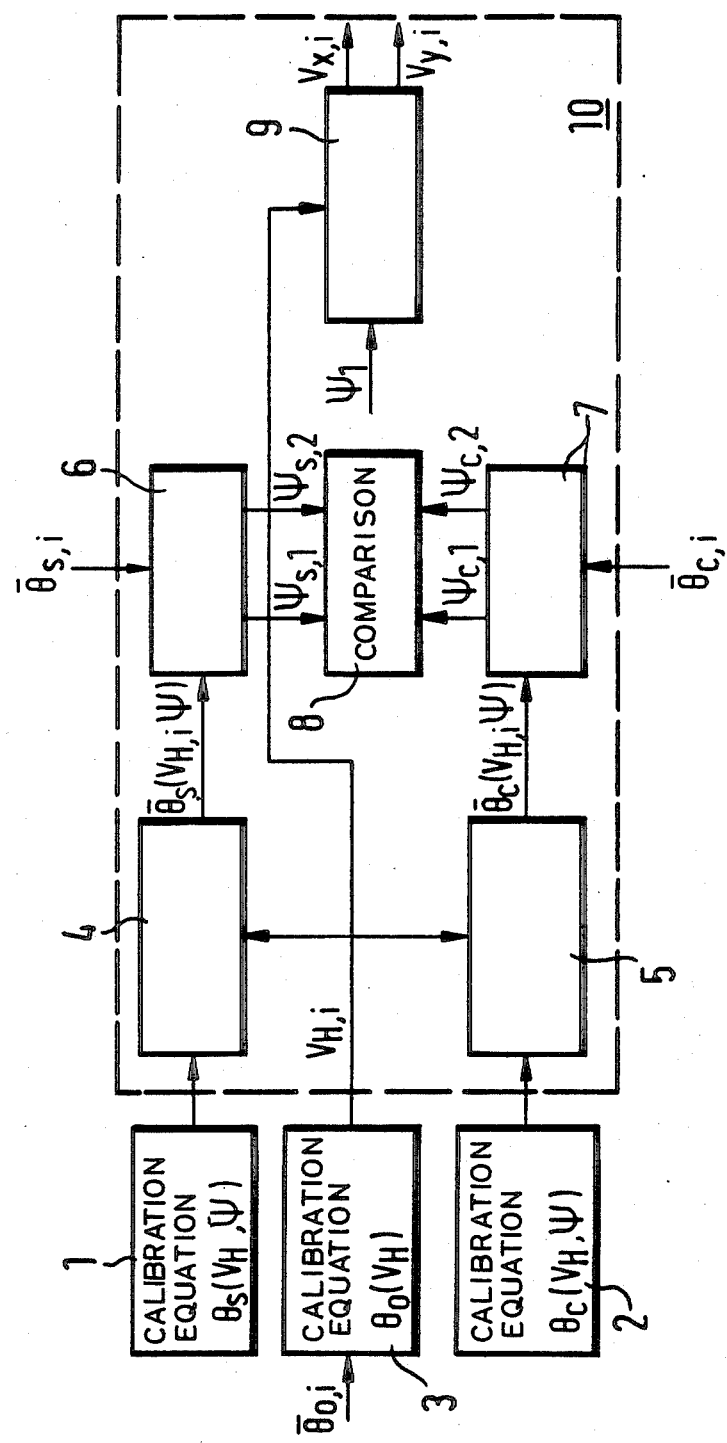
FIG. 4 is a block functional diagram of the method of the invention.

The method of the invention will become further apparent with reference to the block diagram of FIG. 4. The control functions $\theta_o$, $\theta_s$ and $\theta_c$ (also referred to as "control elements") may be detected by conventional helicopter-mounted transducers. Such transducers may include voltage function generators, synchros or resolvers connected to corresponding control levers. The positions of the transducers are not fixed. In the simplest case, the helicopter control levers are provided with potentiometers. The actual angular values $\theta_o$, $\theta_s$ and $\theta_c$ need not be determined for practicing the invention. Rather, the equivalent voltage values $\bar{\theta}_o = f(\theta_o)$, $\bar{\theta}_c = f(\theta_c)$, and $\bar{\theta}_s = f(\theta_s)$ provided by voltage generators (such as the potentiometers) are sufficient.

Referring back to the function block diagram of FIG. 4, the magnitude of the horizontal airspeed $V_{H,i}$ is determined from the voltage value $\bar{\theta}_{o,i}$ corresponding to the collective pitch. A calibration curve or equation (such as that shown in FIG. 5) having been previously determined in calibration flights and stored at block 3 of FIG. 4 may be assumed to be linear in the low speed range (up to 20 m/sec).

The calibration curves or equations of FIGS. 2 and 3 (also determined during calibration flights) that determine the relationship between the cyclic blade setting and the airspeed, after correction for measured temperature values, are referenced to average density and weight values and are stored at blocks 2 and 1, respectively, of FIG. 4. In order to determine velocity profiles $\bar{\theta}_s (V_{H,i}, \psi)$ and $\bar{\theta}_c (V_{H,i}, \psi)$ by approximation in Blocks 4 and 5, the magnitude of the horizontal velocity $V_{H,i}$, calculated or determined by comparison in Block 3, is associated with the non-linear calibration equations for $\bar{\theta}_s$ and $\bar{\theta}_c$.

Figure 8:
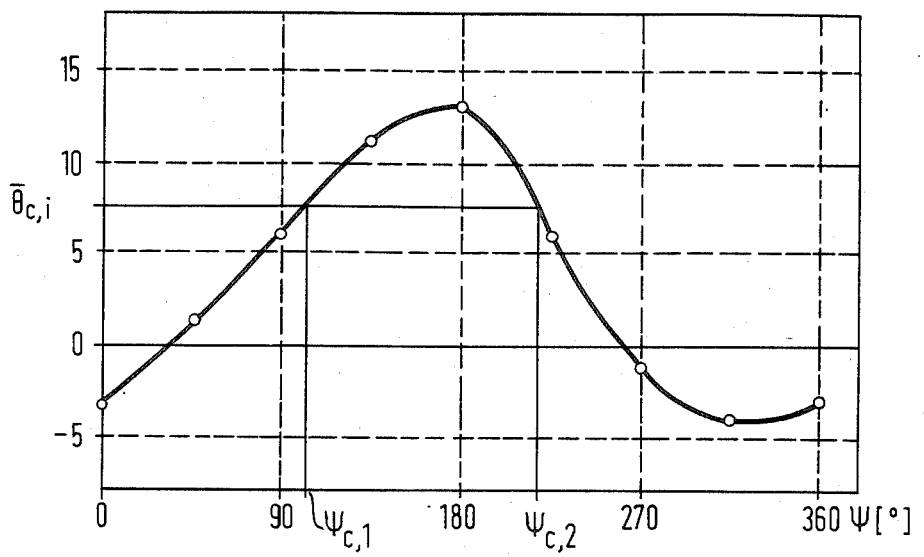
FIGS. 8 and 9 are longitudinal and lateral control functions determined graphically from the velocity profiles of FIGS. 6 and 7 for a given magnitude of horizontal velocity.
Figure 9:
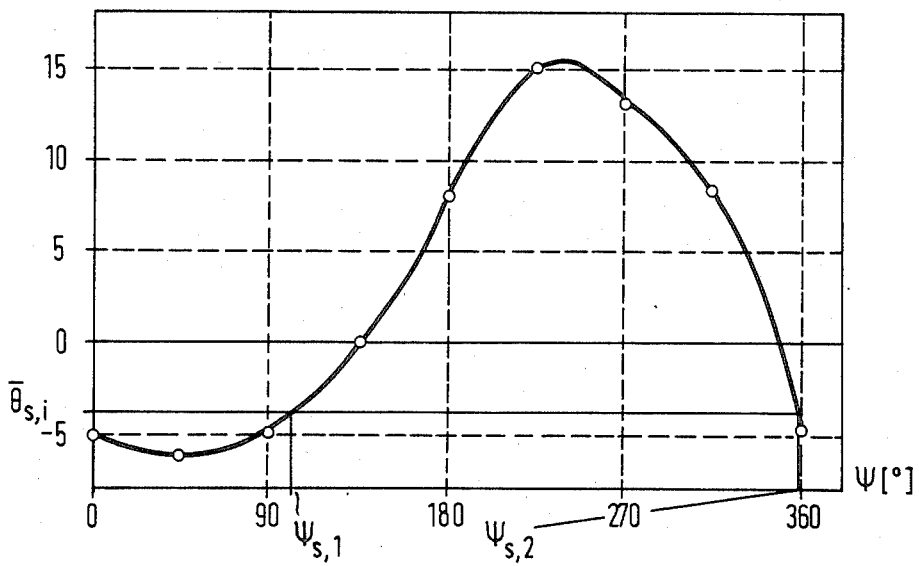

An interpolation calculation or sectioning of the measured values of the longitudinal control $\bar{\theta}_{s,i}$ and the lateral control $\bar{\theta}_{c,i}$, using the calculated velocity profiles of the longitudinal and lateral controls, takes place in Blocks 6 and 7. As can be seen in FIGS. 8 and 9, graphs of longitudinal and lateral control functions determined graphically from the velocity profiles of FIGS. 6 and 7 for a given magnitude of horizontal velocity, this provides, in each case, a pair of angular values $\psi_{s,1}$, $\psi_{s,2}$ and $\psi_{c,1}$, $\psi_{c,2}$, respectively.

By comparing the angular pairs (Block 8 of FIG. 4) the above ambiguity is resolved and the incident flow angle $\psi_i$ is derived. In the example of FIGS. 5, 8 and 9, this angle may be read as approximately $\psi_i = \psi_{c,1} = \psi_{s,1}$ 102°.

Finally, the components of horizontal velocity are calculated, at Block 9, by the transformation equations:

$$V_{x,i} = V_{H,i} \cos \psi_i$$

$$V_{y,i} = V_{H,i} \sin \psi_i$$

The essential concept of the invention is performed within the structural unit 10, as indicated by the dotted border.

An example of the method of this invention for determining the horizontal airspeed of helicopters follows. In the first step of the method, the following normalized voltage values for the collective, longitudinal and lateral controls are detected:

$$\overline{\theta}_{o,i} = 1.4$$

$$\overline{\theta}_{c,i} = 7.7$$

$$\overline{\theta}_{s,i} = -3.9$$

As the next step, the value of the magnitude of the horizontal velocity is obtained from the collective value $\overline{\theta}_{o,i} = 1.4$. The value of $V_{H,i}$ is read from the diagram of FIG. 5 as 12.5 m/s.

Figure 6:
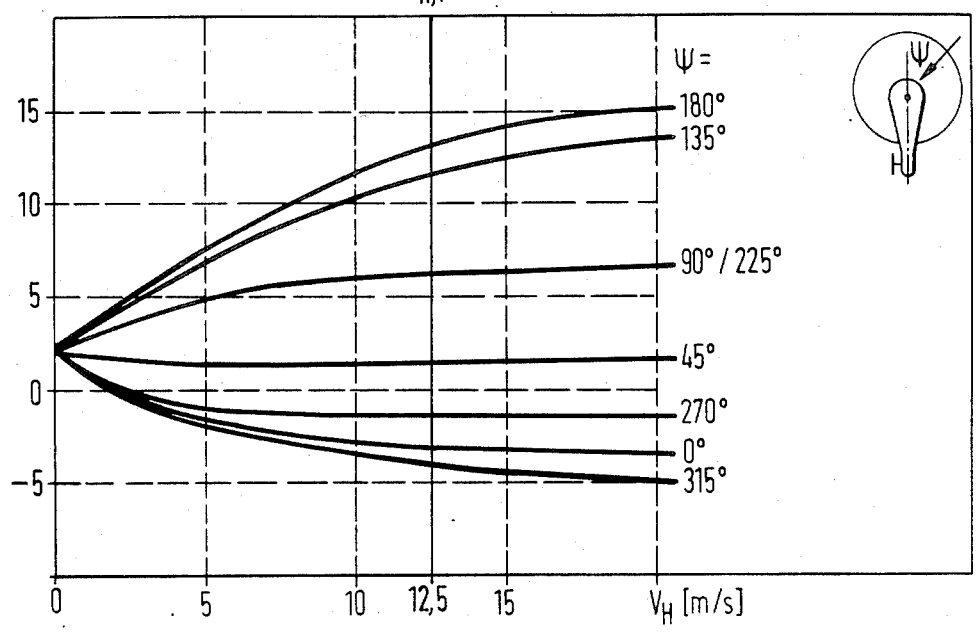
FIGS. 6 and 7 are calibration diagrams, corresponding to FIGS. 2 and 3, for determining the angular value (phase angle) of the horizontal velocity by the process of interpolation or sectioning.
Figure 7:
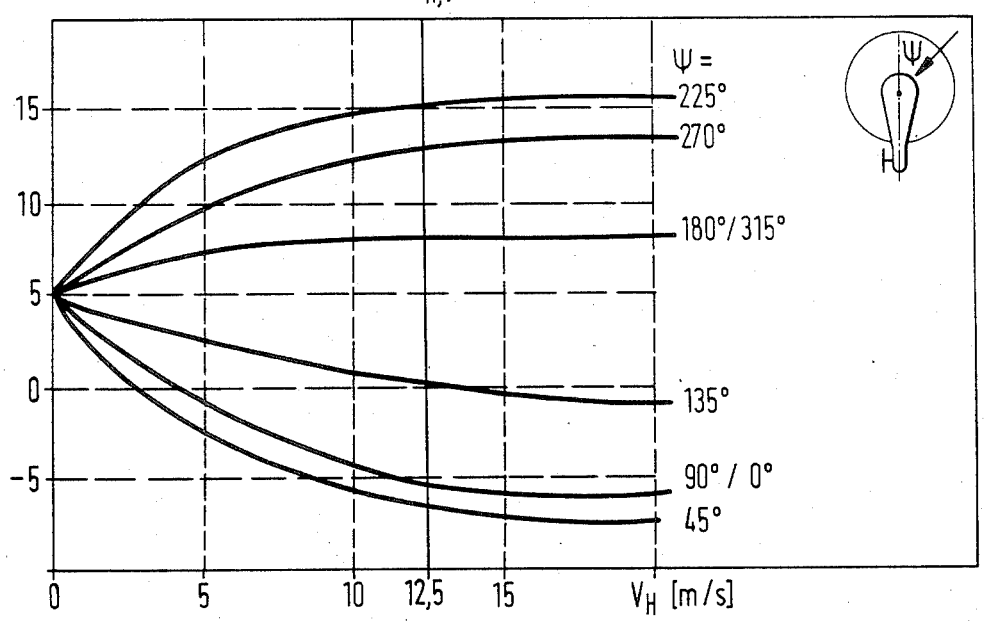

Then, the longitudinal control profile $\overline{\theta}_s$ (FIG. 9) and the lateral control profile $\overline{\theta}_c$ (FIG. 8) for the horizontal velocity value $V_{H,i} = 12.5$ m/s are derived from the calibration curves of FIGS. 7 and 6, respectively.

Using the measured values of the longitudinal control $\overline{\theta}_{s,i} = 3.9$ and of the lateral control $\overline{\theta}_{c,i} = 7.7$, two phase angle pairs $\psi_{s,1}$, $\psi_{s,2}$ and $\psi_{c,1}$, $\psi_{c,2}$, respectively, are read from each of FIGS. 8 and 9. Comparing $\psi_{c,1}$ with $\psi_{s,1}$ and $\psi_{c,2}$ and $\psi_{s,2}$, the incident flow angle, $\psi_i = \psi_{c,1} = \psi_{s,1}$ is determined to be 102 degrees (see FIGS. 8 and 9).

In the final step, the two components of horizontal velocity are calculated as $$V_{x,i} = V_{H,i} \cos \psi_i = -2.6 \text{ m/s}$$

$$V_{t,i} = V_{H,i} \sin \psi_i = -12.2 \text{ m/s}$$

The analytical method according to the invention differs from the analytical system for measuring the velocity of a helicopter known as No. FR-A-74 28786 mainly in its provision of a substantially higher accuracy and a simpler method, because the fuselage attitude angles, such as pitch and roll angle values, are not required for the determination of the velocity. In particular, this system, known in the profession under the designation VIMI (Vitesse Indiquee par Moyens Internes) does not take account of the coupling between longitudinal and transverse control, an essential element of the present invention.

Thus, it is seen that a new method for determining the horizontal airspeed of a helicopter in low speed ranges has been brought to the navigation arts. By employing the method disclosed and claimed herein one may obtain an accurate determination of airspeed without adding vulnerable and difficult-to-maintain apparatus to the exterior of the helicopter.

While this invention has been disclosed with regard to a presently preferred embodiment, its scope is not limited thereto. Rather, the scope of the invention is only limited insofar as defined by the following set of claims and includes all equivalents thereof.

What is claimed is:

1. A method for determining the horizontal airspeed of a helicopter in low speed ranges comprising the steps of:
    (a) determining a first relationship between collective pitch $\theta_o$ and airspeed $V_H$ for said helicopter; and
    (b) determining a second relationship for said helicopter between longitudinal control value $\overline{\theta}_s$ and airspeed $V_H$ for a plurality of directions of incident air flow $\psi$; and
    (c) determining a third relationship for said helicopter between lateral control value $\overline{\theta}_c$ and airspeed $V_H$ for a plurality of directions of incident air flow $\psi$; then
    (d) storing said first, second and third relationships; then
    (e) detecting values $\overline{\theta}_{o,i}$, $\overline{\theta}_{c,i}$ and $\overline{\theta}_{s,i}$; then
    (f) determining horizontal airspeed magnitude $V_{H,i}$ from said first stored relationship and $\overline{\theta}_{o,i}$; then
    (g) deriving a longitudinal control profile $\overline{\theta}_s(V_{H,i}, \psi)$ from said airspeed magnitude and the values of said second stored relationship; and
    (h) deriving a lateral control profile $\overline{\theta}_c(V_{H,i}, \psi)$ from said airspeed magnitude and the values of said third stored relationship; then
    (i) applying the detected value of lateral control $\overline{\theta}_{c,i}$ to said lateral control profile to determine a corresponding first pair of incdient angles $\psi_{c,1}$ and $\psi_{c,2}$; and
    (j) applying the detected value of longitudinal control $\overline{\theta}_{s,i}$ to said longitudinal control profile to determine a corresponding second pair of incident angles $\psi_{s,1}$ and $\psi_{s,2}$; then
    (k) comparing said first and second pairs of incident angles;
    (l) selecting a value common to said incident angle pairs as the incident angle value $\psi_i$; and then
    (m) calculating the components of horizontal airspeed as:

$$V_{x,i} = V_{H,i} \cos \psi_i$$

$$V_{y,i} = V_{H,i} \sin \psi_i.$$

2. A method as defined in claim 1 wherein the values of the control angles $\overline{\theta}_o$, $\overline{\theta}_c$ and $\overline{\theta}_s$ are measured as helicopter control functions.

3. A method as defined in claim 2 wherein the measured control functions values are supplied directly by signal generators connected to helicopter control levers.

4. A method as defined in claim 2 wherein the measured control functions values are supplied by synchros connected to helicopter control levers.

5. A method as defined in claim 2 wherein the measured control functions values are supplied by resolvers connected to helicopter control levers.

6. A method as defined in claim 1 wherein said first, second and third relationships are determined by means of calibration test flights.

* * * * *